Sept. 30, 1930. J. SNEED 1,776,957
FOUR-WHEEL BRAKE
Filed Jan. 16, 1925 4 Sheets-Sheet 1

INVENTOR.
John Sneed
ATTORNEY.

Sept. 30, 1930.  J. SNEED  1,776,957
FOUR-WHEEL BRAKE
Filed Jan. 16, 1925   4 Sheets-Sheet 2

INVENTOR.
John Sneed
BY
Rex Frye.
ATTORNEY.

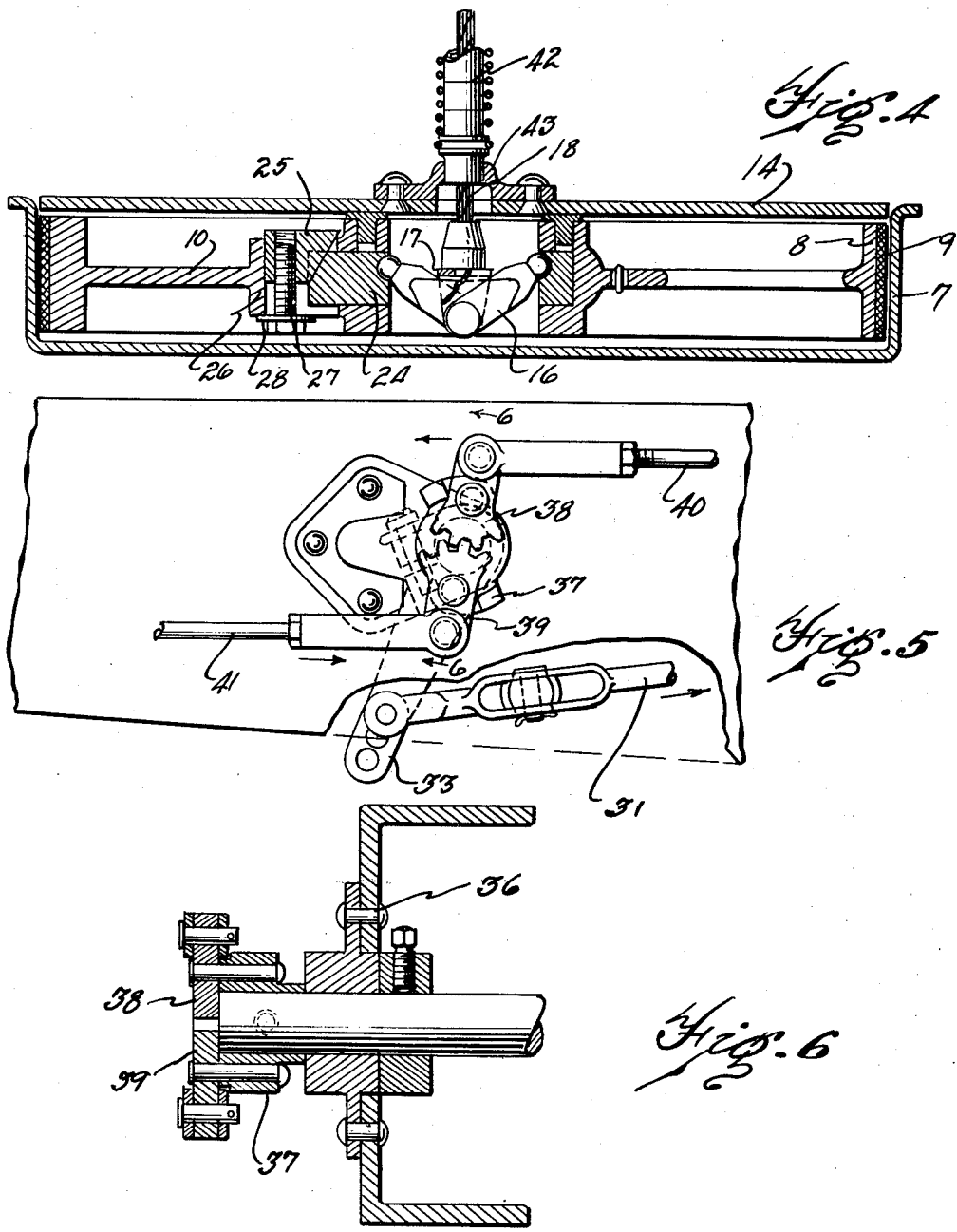

Sept. 30, 1930.                    J. SNEED                    1,776,957
                              FOUR-WHEEL BRAKE
                           Filed Jan. 16, 1925            4 Sheets-Sheet 4

INVENTOR.
John Sneed
BY
Ken Frye
ATTORNEY.

Patented Sept. 30, 1930

1,776,957

UNITED STATES PATENT OFFICE

JOHN SNEED, OF DETROIT, MICHIGAN, ASSIGNOR TO STEELDRAULIC BRAKE CORPORATION, OF DETROIT, MICHIGAN, A CORPORATION OF MICHIGAN

FOUR-WHEEL BRAKE

Application filed January 16, 1925. Serial No. 2,715.

This invention relates to brakes for automobiles and other vehicles, and has for its primary object the provision of a simple and positively acting brake mechanism adapted for simultaneously braking two, four or more wheels.

Another object of this invention is the arrangement of a brake shoe with a flexible portion and a rigid portion whereby the braking resistance is multiplied through the flexible portion and then transmitted to the rigid portion.

A further object of the invention is the mounting of mechanical four wheel brake actuating mechanism whereby equalization is effected regardless of the angular positions of the respective wheels or their differential rotation.

Other objects and advantages will be apparent from the following description, wherein reference is made to the accompanying drawings illustrating a preferred embodiment of my invention and wherein similar reference numerals designate similar parts throughout the several views.

In the drawings:

Fig. 4 is a cross section through the brake, being taken substantially on the line 4—4 of Fig. 2.

Fig. 5 is an enlarged detail elevation of the connections for simultaneously actuating the brakes on the front and rear wheels.

Fig. 6 is a detail section taken substantially on the line 6—6 of Fig. 5.

Fig. 7 is a side elevation of the brake actuating mechanism mounted on a skeleton chassis.

Fig. 8 is a detail elevation of one of the cables and flexible conduit therefor utilized adjacent each brake.

Fig. 9 is an enlarged detail view showing the position assumed by the sections of the flexible conduit when the conduit is bent on a comparatively small radius, and Fig. 10 is a detail section showing the position assumed by the conduit sections when the cable is straightened.

Figure 1:
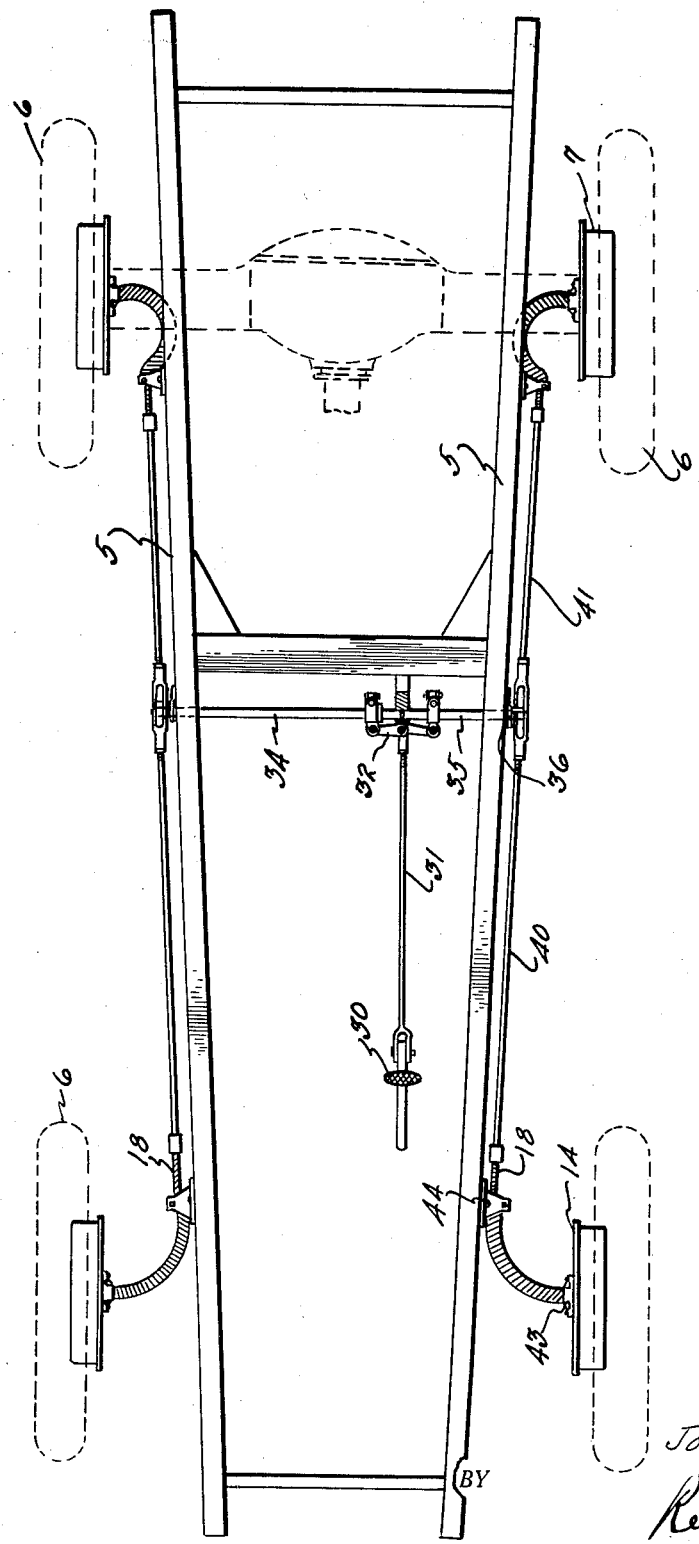
Fig. 1 is a plan view of my improved brake mechanism applied to four wheels on a skeleton chassis.

Referring now to the drawings, the numeral 5 designates a chassis of any desired shape or size, equipped with four wheels 6 of the usual or any desired type. Since the chassis and the wheels themselves form only an incidental relation to the claimed disclosure herein, no attempt has been made to illustrate or describe a completely operative driving and steering mechanism for the wheels 6, it being understood that the showing herein is only for purposes of exemplification of the manner of mounting the brake actuating mechanism and the brakes themselves. While the brake drums 7 are secured to the wheels 6, the manner of securing the drums is immaterial to this invention.

Figure 2:
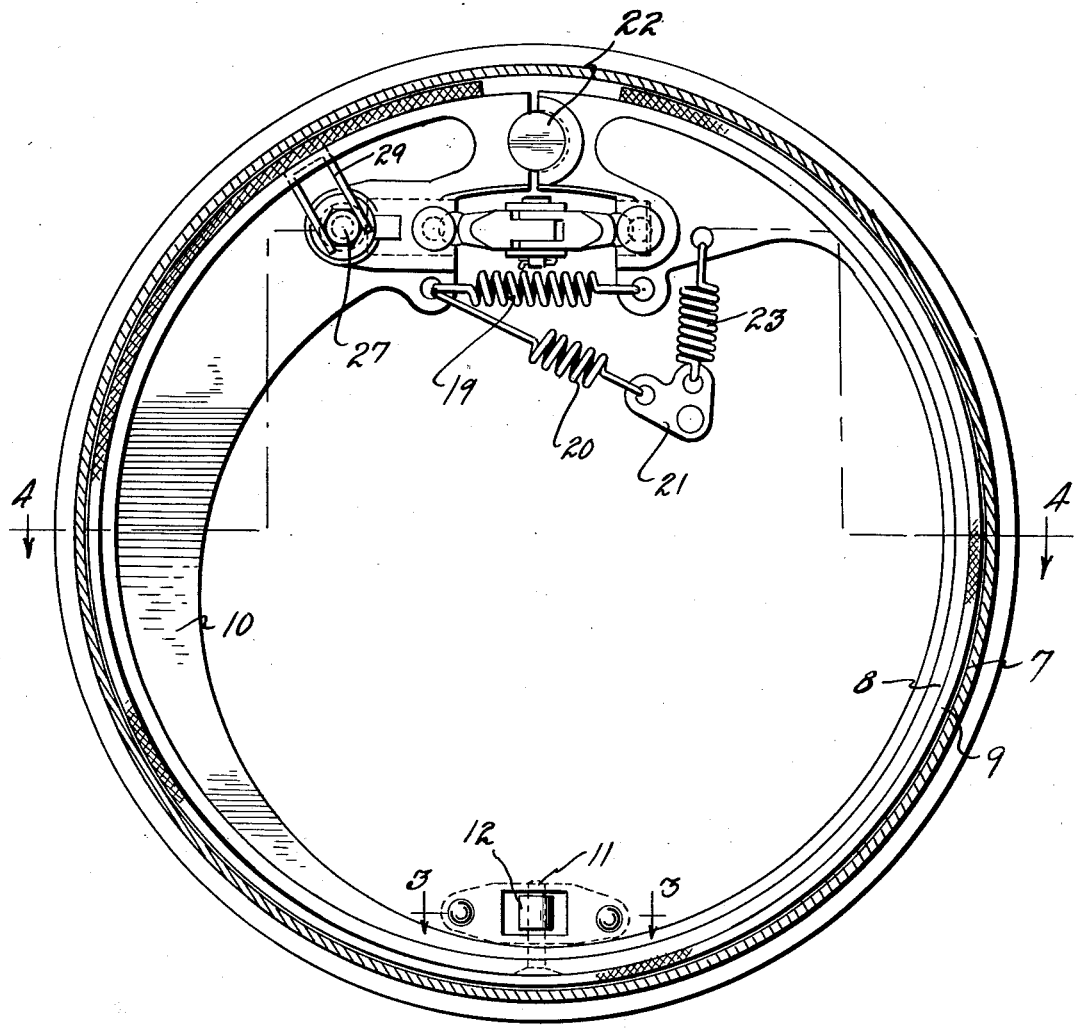
Fig. 2 is an enlarged sectional view through one of the brakes, the brake shoe being shown in normal position.
Figure 3:
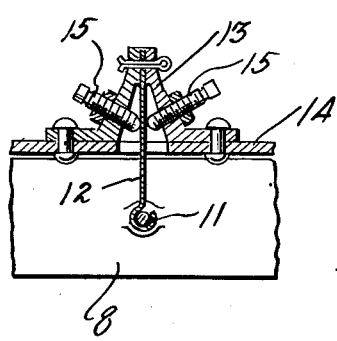
Fig. 3 is a detail sectional view taken substantially on the line 3—3 of Fig. 2.

Each brake drum 7 houses a brake shoe 8 (note Figs. 2 and 4) so that the lining 9 on the shoe is adapted to engage the inner periphery of the brake drum whenever the brake actuating mechanism is operated to set the brakes. As herein shown, each brake shoe 8 is formed as a divided ring open at its uppermost point and having its front half of flexible material and its rear half rigidly braced by means of a strengthening rib 10 extending radially inward from the brake shoe substantially as shown in Fig. 2. A pin 11 extends radially upward from the brake shoe 8 at substantially the dividing point between the flexible and rigid portions of the shoe and a leaf spring 12 is arranged to limit the movement of the brake shoe relatively to the brake drum. As best shown in Fig. 3 one extremity of the leaf spring 12 encircles the radial pin 11 while the opposite extremity is fixed between brackets 13 secured to the face plate 14 substantially covering the brake mechanism at the open side of the brake drum 7. A pair of opposed set screws 15 are preferably mounted in the brackets 13 to engage the opposite sides of the leaf spring 12 whereby any desired inclination of the leaf spring may be secured by adjustment and then maintained. Each brake shoe is adapted to be thrown into engagement with the brake drum 7 upon the movement toward straight line position of a pair of toggle links 16 (note Fig. 4) arranged with their free extremities pivotally mounted in the opposed ends of the brake shoe 8 and their central extremities pivoted upon a yoke 17 to which is connected the operating cable 18 whereby the straightening movement of the toggle links is effected. Whenever the cable 18 is pulled to straighten the toggle links 16, the extremities of the brake shoe 8 are separated against the tension of the coil springs 19 and 20 (note Fig. 2), the spring 19 being directly connected to the extremities of the brake shoe while spring 20 is connected with the rigid extremity of the brake shoe and a bracket 21 fixed upon the face plate 14 or apron. Since the rigid half of the brake shoe can only move as an entirety while the flexible half of the brake shoe is capable of bending movement adjacent the toggle links 16, it will be apparent that the greater portion of the thrust exerted by the straightening movement of the toggle links will be transmitted to the flexible half of the brake shoe, the extremity of the rigid half acting merely as a fulcrum for the leverage necessary to advance the extremity of the flexible portion around the brake drum. Accordingly, the extremity of the flexible portion of the brake shoe is immediately forced into contact with the brake drum, and the rotation of the brake drum tends to carry this extremity of the flexible portion with it until the resistance offered by the brake drum is sufficient to overcome the force of rotation on the brake drum. The result of this is that the braking resistance offered by the flexible portion of the brake shoe is piled up as the flexing continues to bring additional surface of the brake shoe into engagement with the brake drum, and the multiplied resistance is transmitted from the flexible portion of the brake shoe to the rigid portion thereof as soon as the wrapping effect of the brake shoe against the brake drum reaches the portion adjacent the radial pin 11. The rigid portion of the brake shoe acts as a unit and swings into contact with the brake drum with the open extremity thereof as a pivot, the lower extremity of the rigid portion moving against the tension of the leaf spring 12 under the impulse transmitted to it from the flexible portion of the brake shoe.

By virtue of this construction the brakes are applied with a gradually increasing resistance. At the start only the free extremity of the flexible portion of the brake shoe engages the brake drum, and then the remainder of the flexible portion is brought into contact with the brake drum through the wrapping tendency of the flexible portion, and simultaneously the rigid portion of the brake shoe is swung as a unit into engagement with the brake drum after the impulse has been transmitted through the entire flexible portion.

As soon as the pull on the cable 18 is relieved, the brake shoe is removed from contact with the brake drum through the agency of the springs 12, 19 and 20. The spring 12 tends to swing the rigid portion of the brake shoe away from the brake drum and force the lower extremity of the flexible portion upwardly, in which latter action it is assisted by the spring 19 which tends to draw the extremities of the brake shoe toward each other and return the toggle links to their initial positions. The spring 20 aids the spring 19 in returning the toggle links and holds the free extremity of the rigid portion of the brake shoe into engagement with the stop pin 22. A spring 23 may also be arranged between the free extremity of the flexible portion of the brake shoe and the bracket 21 to aid in holding this extremity away from the brake drum during the normal operation of the vehicle.

The adjustment of each brake so as to effect an equalizing action on all the wheels, of the vehicle may be secured by regulating the distances between the extremities of the brake shoe and the free extremities of the toggle links 16. I preferably make the stop pin 22 with a cam surface (shown in dotted lines in Fig. 2), whereby the proper rotation of the stop pin will serve to spread the extremities of the brake shoe to the desired degree. The control of the initial position of the toggle links 16 is secured through the mechanism shown in Fig. 4. One of the toggle links is pivotally mounted in one face of a longitudinally movable fulcrum block 24 while the opposite face thereof contacts a wedge block 25 arranged between the fulcrum block and an extension 26 on the rib 10 of the brake shoe. An adjusting bolt 27 is threaded into the wedge block 25 and carries a washer 28 contacting the extremity of the extension 26. When the adjusting screw 27 is turned in the desired direction the wedge block is moved to slide the fulcrum block 24. Suitable means may be employed for locking the adjusting bolt 27 in any adjusted position, such as the yoke 29 shown in Fig. 2. These adjustments of the extremities of the brake shoe may preliminarily flex the leaf spring 12. If so, one of the opposed set screws 15 may be loosened and the other tightened until the desired setting of the leaf spring 12 is secured.

The mechanism for simultaneously actuating each of the brake shoes 8 will now be described. As best shown in Figs. 1 and 7, the brake pedal 30 is pivotally connected with the forward extremity of the operating link 31, the rear extremity of which is pivoted to the central portion of an equalizer bar 32, the extremities of which bar are pivoted to the depending arms 33 secured on the cross shafts 34 and 35 respectively. The cross shafts 34 and 35 have their inner ends journaled in suitable brackets supported on the chassis so that differential movement of the wheels on either side of the vehicle will not interfere with the action of my braking mechanism. The outer extremities of the shafts 34 and 35 extend through journal brackets 36 and carry operating arms 37 (note Figs. 5 and 6) adjacent the extremities of which are pivoted a pair of intermeshed toothed levers 38 and 39. The upper lever 38 is herein shown as pivotally connected with the pull rod 40 extending to the front wheels of the vehicle while the lower lever 39 is pivotally connected with the pull rod 41 extending to the rear wheels of the vehicle. The opposite extremities of the pull rods 40 and 41 are connected with the inner extremities of the cables 18, the outer extremities of which are connected with the toggle links 16 of the brake shoes, as hereinbefore described. It will be seen from Figures 1 and 7 of the drawing, that the inner extremities of the cables 18 are pulled by the pull rods 40 and 41 in a line substantially parallel to the side rails 5 of the vehicle. Each cable 18 passes through a flexible conduit 42 arranged between a bracket 43 on the face plate 14 adjacent each brake drum (note Fig. 4) and a bracket 44 extending from the chassis 5. The construction of the conduit 42 is best shown in Figs. 8 to 10 inclusive. A plurality of interfitting sections 45 are arranged so that the conduit may be flexed on a comparatively short radius without impairing the path of or exerting a binding action upon the cable 18. The outer surfaces of each section 45 are shaped to snugly fit into a socket 46 in the adjacent surface of the next section 45, and then a second socket 47 is arranged at an angle to the first mentioned socket 46 for the reception of the adjacent interfitting section. This second socket 47 is so disposed to the first socket 46 that when the several sections of the flexible conduit are bent on a short radius, as shown in Fig. 9, the surfaces of the sockets 47 will present an unroughened surface for the cable 18 to slide upon. The end sections 48 of the conduit are provided with circular grooves 49 for securing in the brackets 43 and 44, and with spiral grooves 50 for the mounting of the extremities of a coil spring 51 adapted to engage the peripheries of the conduit sections 45 and normally tend to maintain the conduit in a straight line position. One of the intermediate conduit sections 45ᵃ is preferably formed with a grease cup 52 whereby grease can be readily admitted to the cables.

The operation of my improved braking mechanism is believed to be apparent. When the brake pedal 30 is depressed, the equalizer bar 32 is pulled forwardly to swing the shafts 34 and 35 through the depending arms 33. The oscillation of the shafts 34 and 35 is transmitted to the arms 37 and the toothed levers 38 and 39 pivoted thereon. The movement of these levers 38 and 39 tends to exert a pull upon the cables 18 secured at the extremities of the pull rods 40 and 41 respectively, whereby the several sets of toggle links 16 are simultaneously straightened to bring the brake shoes 8 into engagement with the brake drums 7. Should it happen that the movement of one of the rods 40 or 41 is less than its companion rod, the interfitting toothed levers 38 and 39 will ride upon each other to permit double travel of the rod still free to move. In other words, as soon as the rod 40, for example, can no longer move, its lever 38 will act as a fulcrum for the companion toothed lever, which will rock on the lever 38 and impart double movement to the free pull rod 41.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, I claim—

1. In combination with the frame and wheels of a vehicle, a brake drum carried by each wheel, a brake shoe mounted adjacent each drum, and means for simultaneously moving the brake shoes into braking position including a pair of shafts journaled on the frame, a pair of co-acting levers pivoted upon each shaft, connections between each lever and the brake shoe of one wheel, and means for oscillating the shaft.

2. In combination with the frame and wheels of a vehicle, a brake drum carried by each wheel, a brake shoe mounted adjacent each drum, and means for simultaneously moving the brake shoes into braking position including a pair of shafts journaled on the frame, a pair of interfitting toothed levers pivoted upon each shaft, connections between each lever and the brake shoe of one wheel, and means for oscillating the shaft.

3. In combination with the frame and wheels of a vehicle, a brake drum carried by each wheel, a brake shoe mounted adjacent each drum, and means for simultaneously moving the brake shoes into braking position comprising a brake pedal, a pair of shafts adapted to be oscillated upon movement of the pedal, a pair of co-acting levers mounted to pivot upon each shaft, and connections between each lever of one of the brake shoes.

4. In combination with the frame and wheels of a vehicle, a brake drum carried by each wheel, a brake shoe mounted adjacent each drum, and means for simultaneously moving the brake shoes into braking position comprising a brake pedal, a pair of shafts adapted to be oscillated upon movement of the pedal, a pair of interfitting toothed levers mounted to pivot upon each shaft, and connections between each lever and one of the brake shoes.

5. In combination with the frame and wheels of a vehicle, a brake drum carried by each wheel, a brake shoe mounted adjacent each drum, and means for simultaneously moving the brake shoes into braking position comprising a brake pedal, a pair of shafts journaled on the frame, an arm extending radially from each shaft, an equalizer bar pivoted adjacent its extremities to said arms, a link connecting the central portion of the equalizer bar with the brake pedal, an operating arm fixed upon the outer extremity of each shaft, a pair of co-acting levers pivotally mounted upon each operating arm, and connections between each lever and its adjacent brake shoe.

6. In combination with the frame and wheels of a vehicle, a brake drum carried by each wheel, a brake shoe mounted adjacent each drum, and means for simultaneously moving the brake shoes into braking position comprising a brake pedal, a pair of shafts journaled on the frame, an arm extending radially from each shaft, an equalizer bar pivoted adjacent its extremities to said arms, a link connecting the central portion of the equalizer bar with the brake pedal, an operating arm fixed upon the outer extremity of each shaft, a pair of interfitting toothed levers pivotally mounted upon each operating arm, and connections between each lever and its adjacent brake shoe.

7. In combination with the frame and wheels of a vehicle, a brake drum carried by each wheel, a brake shoe mounted adjacent each drum, and means for simultaneously moving the brake shoes into braking position comprising a brake pedal, a pair of shafts journaled on the frame, an arm extending radially from each shaft, an equalizer bar pivoted adjacent its extremities to said arms, a link connecting the central portion of the equalizer bar with the brake pedal, an operating arm fixed upon the outer extremity of each shaft, a pair of interfitting toothed levers pivotally mounted upon each operating arm, connections between each lever and its adjacent brake shoe including a pull rod pivoted at one extremity to the lever, mechanism arranged to spread the brake shoe when pulled upon, and a flexible cable connecting the opposite end of the pull rod with said mechanism.

8. In combination with the frame and wheels of a vehicle, a brake drum carried by each wheel, a brake shoe mounted adjacent each drum, and means for simultaneously moving the brake shoes into braking position comprising a brake pedal, a pair of shafts journaled on the frame, an arm extending radially from each shaft, an equalizer bar pivoted adjacent its extremities to said arms, a link connecting the central portion of the equalizer bar with the brake pedal, an operating arm fixed upon the outer extremity of each shaft, a pair of interfitting toothed levers pivotally mounted upon each operating arm, connections between each lever and its adjacent brake shoe including a pull rod pivoted at one extremity to the lever, mechanism arranged to spread the brake shoe when pulled upon, a flexible cable connecting the opposite end of the pull rod with said mechanism, and a flexible conduit arranged to house the major portions of each cable.

9. In combination with the frame and wheels of a vehicle, a brake drum carried by each wheel, a brake shoe mounted adjacent each drum, and means for simultaneously moving the brake shoes into braking position including spreading mechanism in engagement with each brake shoe, a cable connected at one extremity to each spreading mechanism, means for pulling upon the opposite extremities of each cable, and a housing for the major portions of each cable comprising a flexible conduit arranged between each wheel and the adjacent sides of the frame.

10. In a device of the class described, a rocker means, two levers fulcrumed to said means at opposite sides of its axis for turning movements therewith, and pivotal movements relative thereto, said levers being connected to cause a movement of one in one direction to impart opposed movement to the other, and separate means connecting the outer ends of the levers to the respective means to which power is to be applied.

11. An equalizing device having in combination a power applying rocker means, members carried by said means for revoluble movements therewith and pivotal movements relative thereto, said members having connection whereby a pivotal movement of one in one direction relative to the rocker means will impart an opposed pivotal movement to the other member, and power transmitting means extending respectively in opposite directions from the outer ends of said member transversely thereof.

12. An equalizing device having in combination a rocker means, members carried by said means for rocking movements therewith and pivotal movements relative thereto, said members having their pivots at opposite sides of the rocking axis of said means and having their inner ends in coaction adjacent to the rocking axis of said means whereby a rocking movement of one member in one direction will impart an imposed rocking movement to the other member, and means for applying power extending from the outer end of each member transversely thereof and away from the direction of coaction of one member with the other.

13. In combination, in a device of the class described, a rock shaft, a rocker head fixed to said shaft at an end thereof and having arms projecting in opposite directions therefrom, a lever pivotally carried by each arm and having its inner end disposed at an end of the shaft and in coaction with the inner end of the other lever, whereby a rocking movement of one in one direction will impart an opposed rocking movement to the other lever, and draft means extending transversely from the outer end of each lever.

14. A power equalizing device comprising a rocker shaft, diametrically opposed arms on said shaft, a lever pivoted intermediate its ends to each of said arms and disposed upon opposite sides of the longitudinal axis of said rocker shaft, means whereby to effect movement of the arms and power transmitting means secured to said levers and movable therewith when the shaft is rocked.

15. In combination with the frame and wheels of a vehicle, a brake drum carried by each wheel, an apron closing the open face of each drum, a brake shoe mounted within each drum, and means for simultaneously moving the brake shoes into braking position including spreading mechanism in engagement with each brake shoe, a cable passing through each apron and connected at one extremity to each spreading mechanism, means for pulling upon the opposite extremities of each cable, a portion of said cable being curved, and a flexible housing for the curved portions of each cable arranged between each apron and the adjacent sides of the frame.

16. In combination with the frame having side rails and the wheels of a vehicle, a brake drum carried by each wheel, a brake shoe mounted adjacent each drum, and means for simultaneously moving the brake shoes into braking position including spreading mechanism in engagement with each brake shoe, a cable connected at one extremity to each spreading mechanism, means for pulling upon the opposite extremities of each cable in a line substantially parallel and adjacent the side rails, and a flexible housing for each cable arranged between each wheel and the adjacent sides of the frame and secured to the side rail of the frame and directing the cable parallel to said side rail.

17. In combination with the frame having side rails and the wheels of a vehicle, a brake drum carried by each wheel, an apron closing the open face of each drum, a brake shoe mounted within each drum, and means for simultaneously moving the brake shoes into braking position including spreading mechanism in engagement with each brake shoe, a cable passing through each apron and connected at one extremity to each spreading mechanism and including a curved portion, means for pulling upon the opposite extremities of each cable, and a curved flexible housing for the curved portions of each cable arranged between each apron and the adjacent rails of the frame, said housing guiding the cable in a curved path from the apron to the adjacent side rail of the frame and parallel thereto at the frame.

18. In combination with the frame having side rails and the wheels of a vehicle, a brake drum carried by each wheel, an apron closing the open face of each drum, a brake shoe mounted within each drum, and means for simultaneously moving the brake shoes into braking position including spreading mechanism in engagement with each brake shoe, a cable passing through each apron and connected at one extremity to each spreading mechanism and including a curved portion, means for pulling upon the opposite extremities of each cable, and a flexible housing for the curved portions of each cable arranged between each apron and the adjacent side rails of the frame, said housing guiding the cable in a curved path extending parallel to the side rail of the frame at one end and normal to the apron at the other end.

19. In combination with the frame having side rails and the wheels of a vehicle, a brake drum carried by each wheel, a brake shoe mounted adjacent each drum, and means for simultaneously moving the brake shoes into braking position including spreading mechanism in engagement with each brake shoe, a cable connected at one extremity to each spreading mechanism and including a curved portion, means for pulling the opposite extremities of each cable along the side rails of the frame and toward each other on the same side of the frame, and a flexible housing for the curved portions of each cable arranged between each wheel and the adjacent side rails of the frame, and secured to said side rails and extending in a curved path away from the frame and lying tangential to the side rail of the frame at its point of attachment thereto.

20. In combination with the frame having side rails and the wheels of a vehicle, a brake drum carried by each wheel, a brake shoe mounted adjacent each drum, and means for simultaneously moving the brake shoes into braking position including spreading mechanism in engagement with each brake shoe, operating connections for said mechanism including a cable lying at least in part in a curved path between the frame and a wheel and connected at one extremity to each spreading mechanism, means for pulling the opposite extremities of each cable along the side rails of the frame and toward each other on the same side of the frame and including cross shaft means extending laterally of the vehicle and having a pair of arms adjacent each side rail engaging a pair of said connections extending to a front and rear brake respectively, and a flexible housing for the curved portion of each cable arranged between each wheel and the adjacent side rails of the frame, and secured to said side rails and extending in a curved path away from the frame and lying tangential to the side rail of the frame at its point of attachment thereto.

In witness whereof I hereunto set my hand.

JOHN SNEED.